United States Patent
Hirschek

[19]

[11] Patent Number: 6,074,155

[45] Date of Patent: Jun. 13, 2000

[54] METHOD AND DEVICE FOR HANDLING AND STACKING PRESSED BALES

[75] Inventor: Herwig Hirschek, Bobingen, Germany

[73] Assignee: Autefa Maschinenfabrik GmbH, Germany

[21] Appl. No.: 08/860,683

[22] PCT Filed: Dec. 13, 1995

[86] PCT No.: PCT/EP95/04913

§ 371 Date: Jun. 11, 1997

§ 102(e) Date: Jun. 11, 1997

[87] PCT Pub. No.: WO96/18560

PCT Pub. Date: Jun. 20, 1996

[30] Foreign Application Priority Data

Dec. 13, 1994 [DE] Germany .......................... 94 19 918 U

[51] Int. Cl.[7] .................................................. B65G 1/00
[52] U.S. Cl. .......................................... 414/273; 414/802
[58] Field of Search .................................. 414/281, 283, 414/273, 744.2, 744.3, 744.4, 753, 802; 212/434

[56] References Cited

U.S. PATENT DOCUMENTS

| | | | |
|---|---|---|---|
| 3,417,857 | 12/1968 | Hickey . | |
| 3,499,554 | 3/1970 | Davis et al. ............................. | 414/283 |
| 4,005,786 | 2/1977 | Adelson et al. ........................ | 414/283 |
| 4,722,657 | 2/1988 | Grube ...................................... | 414/283 |
| 4,726,725 | 2/1988 | Baker et al. ............................ | 414/283 |
| 5,087,169 | 2/1992 | Tubke .................................. | 414/744.3 |
| 5,292,221 | 3/1994 | Fenander ............................... | 414/744.4 |
| 5,440,943 | 8/1995 | Holt et al. ............................. | 414/744.3 |
| 5,664,928 | 9/1997 | Stauber .................................... | 414/281 |

FOREIGN PATENT DOCUMENTS

| | | | |
|---|---|---|---|
| 1.447.434 | 6/1965 | France . | |
| 25 09 223 | 9/1975 | Germany . | |
| 40 29 759 A1 | 3/1992 | Germany . | |
| WO 92/04713 | 3/1992 | Germany .............................. | 414/283 |
| 105 271 | 6/1942 | Sweden . | |

OTHER PUBLICATIONS

Robots dispense mixes at dye works, *Materials Handling News*, Jun. 1987.

Dipl.–Ing. Herbert Krippendorff, Dec. 1963, Das autooma-tisierte Lager–Amerikanische Beispiele der Teil–und Vol-1–Automatisierung, Förderm und Heben, 13.

*Primary Examiner*—Robert P. Olszewski
*Assistant Examiner*—Douglas Hess
*Attorney, Agent, or Firm*—McGlew and Tuttle PC

[57] ABSTRACT

A process and a device for handling and stacking pressed bales in a bale storage facility with at least one stacking device (1), which has a traveling crane bridge (3), a bogie truck (4) and a hanging-down guide beam (5). A grabbing device is provided for one or more, preferably three pressed bales (2) is arranged on it vertically movably and rotatably around the vertical axis. The stacking device (1) has a remote control and a fully automatic, computer-aided storage management system. After loading into the storage area, the bales can be re-sorted in the bale storage facility fully automatically and arranged according to the type of bale, grade and other criteria.

18 Claims, 2 Drawing Sheets

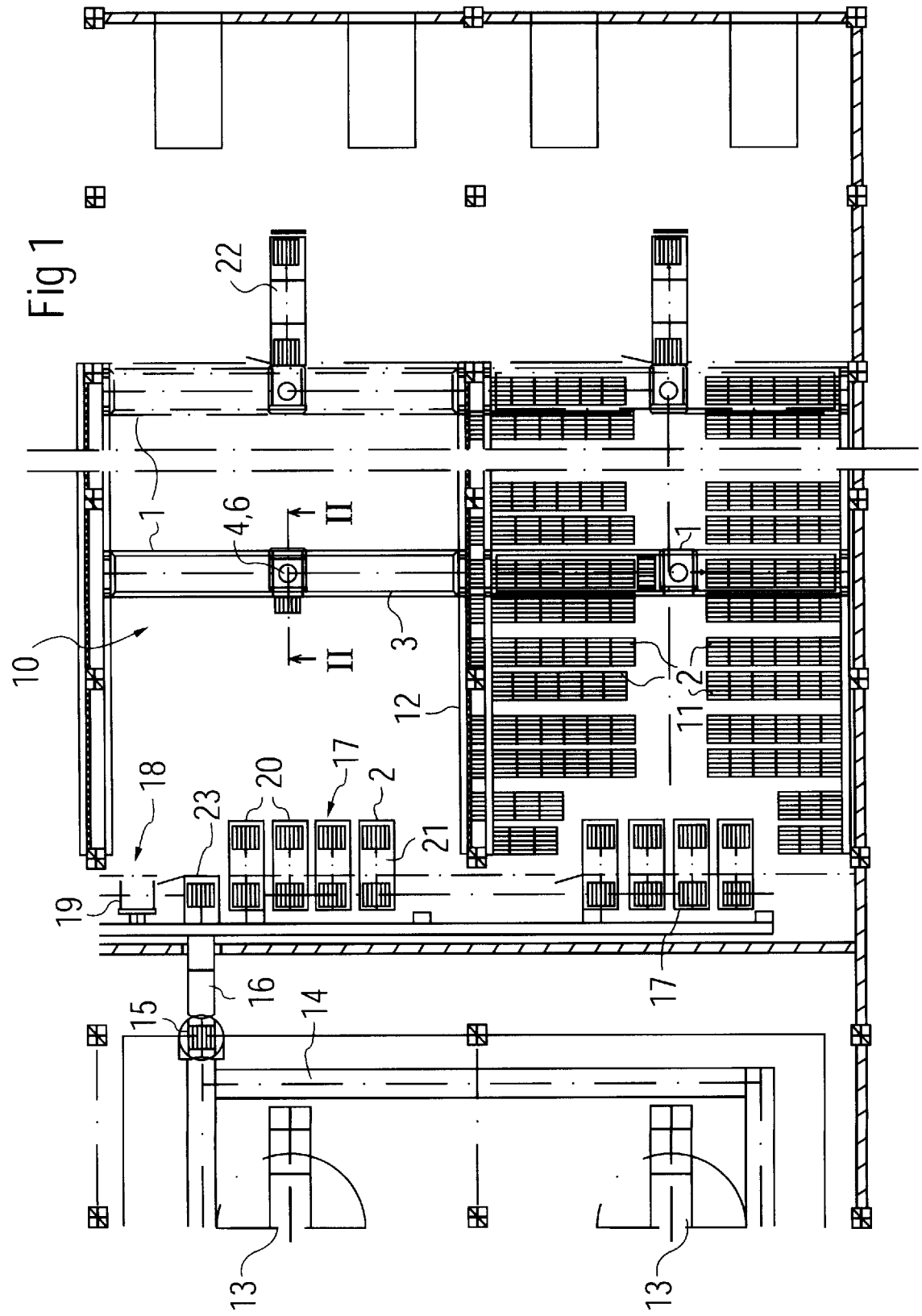

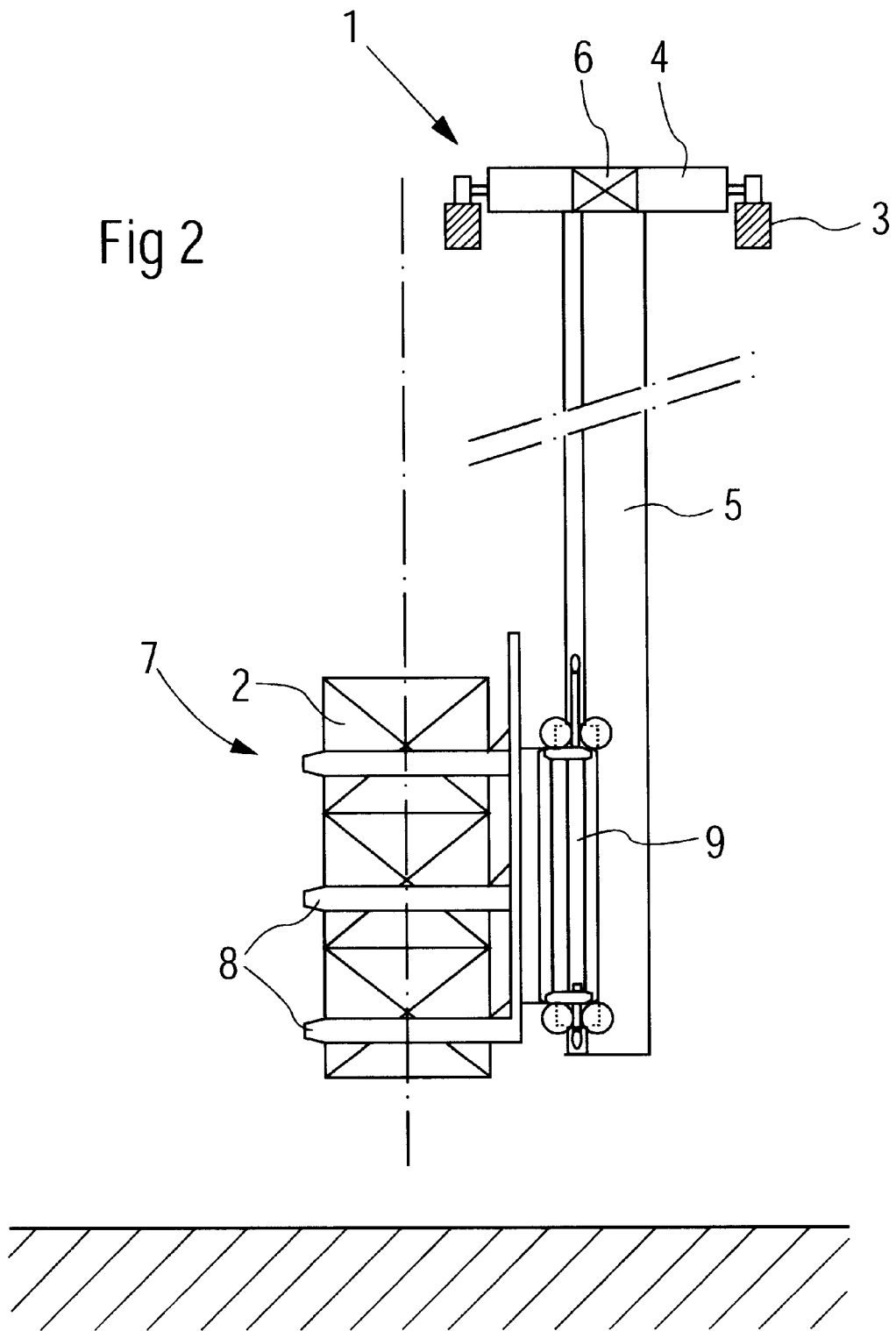

METHOD AND DEVICE FOR HANDLING AND STACKING PRESSED BALES

FIELD OF THE INVENTION

The present invention pertains to a process and a device for handling and stacking pressed bales in a bale storage facility.

BACKGROUND OF THE INVENTION

It has been known in practice, especially in the area of pressed bales of textile fibers, that the pressed bales are transported by means of handcarts and are brought from the baling press to a storage facility and are stacked there in rows next to each other and one on top of another in a plurality of layers. A forklift truck is shown for this in DE-A-40 29 759. This technique is labor-intensive and error-prone if different pressed bales, which must be handled and stored separately, are produced in a pressing unit.

It has also been known that the pressed bales can be transported with a crane and a grab hanging on cables. The grab can grasp a single bale only and only from the top. In addition, the crane must have been absolutely stopped for this. The conveying capacity is appreciably limited by this.

High-shelf storage areas, in which the pressed bales are placed one by one into shelf compartments, have also been known in practice. The storage technique is very expensive, because it requires large space and great construction and control efforts.

SUMMARY AND OBJECTS OF THE INVENTION

The primary object of the present invention is to provide a better and more economical possibility for handling and stacking pressed bales.

According to the invention, a process is provided for handling and stacking pressed bales in a bale storage facility. The pressed bales are loaded into and removed from the bale storage facility with at least one multiaxially movable (movable in more than one of a plurality of orthogonal directions—movable in an x, y and z direction in a three dimensional space), automatic stacking device. The pressed bales are stacked up in stacks comprising a plurality of layers and are arranged in rows.

The device for handling and stacking pressed bales in a bale storage facility according to the invention includes at least one said stacking device with a traveling crane bridge, with a said bogie truck, and with a hanging-down guide beam. A grabbing means for one or more said pressed bales is guided on the guide beam vertically movably and rotatably around the vertical axis.

At least one stacking device, which is able to travel over the bale storage facility in the manner of a gantry and transport and stack up the bales with a hangingly guided grabbing means, is arranged in the bale storage facility. The stacking device is faster, more reliable in operation and more economical than the prior-art solutions. It saves manpower, especially if remote control is present.

To achieve the greatest possible mobility of the grabbing means, it is recommended that the guide beam hanging down be mounted rotatably, along with the grabbing means, on the bogie truck of the traveling crane bridge. To increase the velocity and the bale throughput, it is also favorable to equip the grabbing means with a plurality of forks, which is able to handle, e.g., a small stack consisting of three pressed bales.

Such a small stack fits the usual loading height of trucks or containers and makes possible a very rapid loading. The capacity of the stacking device can also be increased due to the small stacks. This is advantageous in light of the different time periods available for loading and unloading into and from the storage facility. The production and loading in the storage facility of the bales takes place day and night, seven days a week in automatic industrial plants. However, the removal of the bales from the storage facility and their shipping in containers or trucks may take place, e.g., during the day only and not on every day of the week, and it must be performed in a correspondingly shorter time. The crane and stacking capacity necessary for this is ensured by the handling of small stacks of three bales.

The stacking device according to the present invention makes it possible to store the bales in a very space-saving manner and to arrange the rows of stacks at closely spaced locations from one another. The bales are located one on top of another in the stacks, and the rows of stacks are built up and taken down from the central aisle. Large aisles between the rows, which are to be kept free, can be done away with. Expensive shelves, as they are used in shelf-type storage areas, are dispensable in the bale storage facility according to the present invention.

In another improvement, the stacking device is preceded by one or more intermediate storage areas, in which small stacks of pressed bales are formed on separate storage places and are kept ready for pick-up by the stacking device. Pressed bales of different sizes, different contents or different grade may be kept ready separately in stacks containing one type only. The intermediate storage areas may act as buffers and relieve the stacking device. It is possible as a result to serve a larger section of the bale storage facility with one stacking device. This also increases the capacity of the stacking device and of the bale storage facility.

The intermediate storage areas may be connected to one or more baling presses arranged upstream of them directly or possibly indirectly, through additional storage facilities.

Furthermore, the stacking device advantageously cooperates with a delivery station, in which the pressed bales are kept ready one by one or in small stacks of two or three for pick-up and further use.

To further optimize the facility, it is recommended that a control covering the entire facility be provided for the stacking device(s), the intermediate storage areas and possibly the delivery station(s). As a result, the bale storage facility can be operated and managed, for the most part, automatically.

The control may contain a computer with a storage facility management software and with a data bank for the virtual storage or stacking places. The location in the storage facility and the relevant, product-related data, such as the identity of the bale, the type of bale or fiber, the size of the bale, the fiber grade, the date of manufacture, etc., are stored in it. Due to the absence of a fixed subdivision of the storage facility, as it is present in a shelf-type storage facility with permanent storage places, the locations within the storage facility are determined and stored in relation to one another in the bale storage facility management system.

The storage facility management system makes possible unsorted and especially rapid loading in the storage facility. Quality control may also take place without loss of time. An expensive manual marking of the bales may be done away with. This leads to a reduction in accident hazard and to an increase in the permissible stacking height.

The bale storage facility can be automatically re-sorted during no-work or quieter periods, e.g., in the night. Ordered bale stacks or rows of stacks containing only bales of the same type are thus available at the time of unloading for rapid pick-up and loading.

The present invention is schematically shown in the drawings as an example.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic top view of a bale storage facility consisting of a plurality of sections with a plurality of stacking devices and additional parts of the facility; and FIG. 2 is the cross section of a stacking device corresponding to the section line II—II in FIG. 1.

DESCRIPTION OF THE PREFERRED EMBODIMENTS

Referring to the drawings in particular, the invention comprises a bale storage facility 10 (shown in FIG. 1) which has two storage area sections in the embodiment shown. There also may be only one section, or there may be a plurality of sections. There are two stacking devices 1, which will be described in greater detail below, and with which the pressed bales 2 are handled and stacked, in each section of the storage facility. The pressed bales 2 are preferably bales which are pressed from synthetic fibers in an upstream baling press 13 under high pressure. The textile fibers may be in the short-cut form as so-called staple fibers or in the form of a strand as a so-called tow. However, as an alternative, the pressed bales may also consist of other materials, e.g., small plant parts, such as straw or the like. The pressed bales 2 are preferably packaged in a film and are optionally held together by a plurality of tightening straps.

Two stacking devices 1 are arranged in each section of the storage facility in the embodiment shown. However, there also may be fewer or more, depending on the size of the section. FIG. 1 shows the top view of the stacking devices 1, and FIG. 2 shows a sectional side view.

The individual stacking device 1 comprises a crane bridge 3, which is longitudinally displaceable on elevated rails 12 over the bale storage facility 10 or the associated section of the storage facility. The crane bridge 3 is designed as a frame open on the inside, on which a bogie truck 4 is transversely movable. A rigid guide beam 5 hangs on the bogie truck 4, preferably vertically downward, and it carries a vertically movable grabbing means 7. The guide beam 5 is suspended on the bogie truck 4 pivotably around a vertical axis via a rotating means 6. It is mounted tiltably around the horizontal axes. The crane bridge 3, the bogie truck 4, and the rotating means 6 have suitable drives (not shown).

The guide beam 5 of rod-shaped or frame-shaped design carries a traveling gear 9, to which the grabbing means 7 is fastened. The traveling gear 9 is guided vertically movably at the guide beam 5 and can move up and down with a suitable drive (likewise not shown).

In the embodiment shown, the grabbing means 7 has forks 8, which are arranged at spaced locations from one another one on top of another. Each fork 8 has, e.g., two grabs or prongs, which are mounted and driven in such a way that they are movable at right angles to one another. The three forks 8 may be driven together or individually. The grabbing means 7 can grab the pressed bales 2 on the side with the forks 8 and clamp them with the prongs. In the embodiment shown, the three forks 8 grab a small stack of three pressed bales 2 lying one on top of another, with each fork 8 grabbing one pressed bale 2. The number of pressed bales 2 and of the forks 8 may vary in other embodiments.

The pressed bales 2 can be lifted by means of the grabbing means 7 and be moved in the bale storage facility 10 or in a section of the storage facility biaxially with the crane bridge 3 or the bogie truck 4. Larger bale stacks may be formed from the small stacks, and these larger bale stacks may consist of a plurality of layers one on top of another and of a plurality of stacks arranged in rows one behind the other. FIG. 1 shows these rows of stacks in the lower section of the storage facility. The crane bridge 3 with its rails 12 is arranged at a correspondingly elevated location, and the guide beam 5 also has a corresponding length.

As is illustrated in FIG. 1, a preferably central aisle 11, through which the stacking devices 1 with the pressed bales 2 grabbed can be moved along the laterally adjoining, transversely directed rows of stacks, is formed in the bale storage facility 10 or in the respective section of the storage facility. The aisle 11 may be very narrow due to the space-saving design and the guide beam 5 rotatable around its central axis. The pressed bales 2 can be rotated almost in one spot.

For pick-up and removal, the pressed bales 2 are held by the grabbing means 7 in the longitudinal direction of the aisle. Once the desired row of stacks has been reached, the guide beam 5 rotates to the left or right by 90°, so that the pressed bales 2 can be brought to the row of stacks or to an empty storage place due to the traveling movement of the bogie truck 4.

The stacking device 1 first deposits the pressed bales 2 or the small stack one on top of another in a plurality of layers, until the desired stack height is reached. The stacks may be built up in a slightly oblique position and lean against the wall or another support surface. The next stack consisting of a plurality of layers is then formed in the row. The row thus gradually grows toward the aisle 11 and is taken down in the reverse order. Only very little space needs to be left free for the movement of the fork between the rows.

As an alternative, it is possible to move with the stacking device 1 between the rows of stacks and to build up and take down the stack from the side if there is a correspondingly great distance between the rows.

The stacking devices 1 preferably have a remote control, which is also coupled with a storage facility management system at the same time. Different pressed bales 2 can thus be handled and stacked in the bale storage facility 10. The pressed bales 2 may be distinguished, e.g., according to size, weight, contents or the bale material, according to the customer who will perform the further processing, or other criteria. Rows of stacks containing the same type of material only are preferably formed in the bale storage facility 10 or in the sections of the storage facility.

One or more intermediate storage areas 17 are arranged at the entrance side of the bale storage facility 10 and preferably at the front end of the aisle(s) 11. Each section of the storage facility preferably has an intermediate storage area 17 of its own. The intermediate storage areas 17 preferably have a plurality of storage places 20, on which the above-mentioned small stacks are formed from the individual pressed bales 2 fed in and are made ready for pick-up for the stacking device 1. Stacks containing one type of material only are again formed in the storage places 20, which are separated from one another.

The intermediate storage areas 17 have a stack former 18 of their own or, as an alternative, a common stack former 18. This has a bale grab 19, which is mounted and driven in such a way that it is displaceable at right angles to the storage places 20 and the aisles 11 and can additionally also be raised and lowered. The bale grab 19 takes over the individual bales from a receiving station 23, brings it to the individual storage places 20, and stacks them there to the intended small stack height.

Each storage place 20 also has a conveyor 21, which is preferably designed as a roller conveyor. However, other desired embodiments are also possible. The small stacks are formed at the front end of the storage places 20. Once a small stack is ready, it is moved by the conveyor 21 to the rear end of the storage place 20 and it is ready for pick-up by the stacking devices 1 there.

A single stack former 18 with an intermediate storage area designed as a simple platform or the like may also be provided in a simplified embodiment. All arriving bales are stacked up there to form a small stack regardless of type, grade, etc., and are transported into the bale storage facility 10.

The intermediate storage areas 17 are directly connected to the upstream baling presses 13 in the preferred embodiment. There are two baling presses 13 in the exemplary embodiment shown. However, there also may be fewer or more baling presses. The finished pressed bales 2 are collected on suitable conveyor belts 14. They can be rotated one by one into the correct position for handling by means of a turntable 15. They are then fed to the receiving station 23 of the intermediate storage area or areas 17 via a conveying bridge 16. The conveying bridge 16 may be swung open to permit the passage of vehicles.

A delivery station 22 is provided at the rear end of the bale storage facility 10 or of the section of the storage facility. A plurality of such delivery stations 22 may be present as well. The stacking devices 1 serve the delivery stations 22 and deliver the pressed bales 2 one by one or in the above-mentioned small stacks. The delivery stations 22 may have a conveyor of their own (not shown), with which the pressed bales 2 are brought into the pick-up positions for other conveying means, e.g., handcarts.

A control (not shown), which is preferably a control covering the entire facility, is provided to automate the bale storage facility 10. The control is coupled with a storage facility control system and may also be coupled with a higher-level process control of the baling presses 13. The pressed bales delivered from the baling presses 13 can thus be automatically divided between the sections of the storage facility via the intermediate storage areas 17 and be kept ready in the said small stacks. The pick-up, handling, and the loading into the storage area by means of the stacking devices 1 will then take place likewise automatically. The delivery of the pressed bales 2 on the delivery side of the bale storage facility 10 is thus also automated. As an alternative, the bale storage facility 10 may also have an independent storage facility management system and possibly control.

For the storage facility management, the control has a computer with a storage facility management program and a data bank for the virtual stacking or storage places of the bales 2 and possibly with a sorting program. Data on the storage location of the pressed bale 2, the identity of the bales, the type of the bale or fiber, the fiber grade, the bale size, the type of packaging, the date of manufacture, and other desired product-related or other relevant properties of the bale are stored in the data bank in suitable data records.

Unlike in shelf-type storage areas with a predetermined storage capacity and permanent shelf positions, the bales 2 in the bale storage facility 10 do not necessarily have a permanently predeterminable place, which can be referred to as an absolute position. The stacks and rows of bales 2 lying one on top and next to each other, are formed only at the time of loading into the storage area, and the length of the rows and the stack height may vary, which may also depend, e.g., on the size of the bales. The storage location may also change once or several times when another bale is removed from a row. The storage locations of the bales 2 are identified and stored in a relative relationship to one another, e.g., according to their position in the row or in the stack. It is possible due to the association of the data to immediately and reliably find each bale 2 in the bale storage facility 10 after loading into the storage area.

This is useful for a quality control, which is performed before the pressed bales 2 are loaded into the storage area. To do so, samples are taken from all or some of the pressed bales 2 delivered and are tested for certain properties, e.g., the type of fiber, grade of fiber, etc. The pressed bale 2) may be brought into the bale storage facility 10 immediately after the sampling. The quality data may later be added to the corresponding data record. This is possible on the basis of an unambiguous labeling, e.g., serial numbering of the bales. The previously common manual marking of a pressed bale is eliminated as a result. A labeling or marking containing the quality data had to be applied later to the bales loaded into the storage area, which implied a considerable accident hazard and therefore also limited the maximum stacking height in the bale storage facility. This is no longer necessary due to the fully automatic, computer-aided storage facility management.

The fully automatic storage facility management system also makes it possible to stack up the pressed bales 2 delivered in layers to form small stacks without regard to the type of bale, the fiber grade and other distinguishing criteria and to bring them into the bale storage facility 10. As a result, loading into the storage facility takes place especially rapidly. In addition, the intermediate storage areas 17 can be simplified.

The sorting of the bales can then be performed at a given time in the intermediate storage area 10 and it can take place fully automatically. The sorting process is performed with the stacking device. Once the product-related data and the storage location of each pressed bale are known, the sorting according to type can be performed on the basis of a suitable sorting program. This is done as, e.g., an intermediate sorting during the no-work periods, e.g., during the night shift. Suitable free spaces are provided as buffer spaces for the sorting process within the bale storage facility 10. The stacks or rows of bales 2 can be arranged according to the types of bales and, within one type, according to different grades and other suitable criteria. The arranged stacks or rows make possible an especially rapid access and removal of the bales 2 at the time of removal from the storage facility.

In another variant, the pressed bales 2 are loaded into the storage facility without arrangement, and they are sorted only at the time of unloading from the storage facility. The virtual storage or stacking places of the bales in the data bank are used for this purpose as well.

Various modifications of the exemplary embodiment shown are possible. Instead of the crane construction, it is also possible to provide self-propelled gantries. The rotating means 6 may be located at another location, and a guide beam 5 consisting of, e.g., two sections is rotatable in itself, or the rotatability is present in the traveling gear 9 or in the grabbing means 7. The intermediate storage areas 17 may be reduced or omitted for simpler embodiments. The separate delivery stations 22 may also be eliminated. The bale storage facility 10 may also be designed and managed as a completely independent bale storage facility, in which case there is, e.g., no direct connection with the baling presses 13. The other design embodiments of the individual parts of the facility and devices may also be modified within the framework of the general technical know-how.

While specific embodiments of the invention have been shown and described in detail to illustrate the application of the principles of the invention, it will be understood that the invention may be embodied otherwise without departing from such principles.

APPENDIX

LIST OF REFERENCE NUMBERS

1 Stacking device
2 Pressed bale
3 Crane bridge
4 Bogie truck
5 Guide beam
6 Rotating means
7 Grabbing means
8 Fork
9 Traveling gear
10 Bale storage facility
11 Aisle
12 Rail
13 Baling press
14 Conveyor belt
15 Turntable
16 Conveying bridge
17 Intermediate storage area
18 Stack former
19 Bale grab
20 Storage place
21 Conveyor, roller conveyor
22 Delivery station
23 Receiving station

What is claimed is:

1. A process for handling and stacking pressed bales in a bale storage facility, comprising the steps of:
   providing compressed bales of fibers;
   loading and removing the compressed bales from the bale storage facility with at least one multiaxially movable, automatic stacking device with a bale grabbing device, said grabbing device gripping the compressed bales from the side with lateral clamping movement;
   supporting the grabbing device from above the compressed bales to provide access to the compressed bales from above the compressed bales, said step of supporting being provided with a stacking device having a substantially rigid member to avoid swaying of the grabbing structure;
   stacking the compressed bales up one above the other in stacks consisting of a plurality of layers and arranged in rows, each compressed bale in each stack being in direct contact with another compressed bale in said stack; and
   managing the bale storage facility with a storage facility management program and a data bank, wherein storage location and product-related data of each compressed bale are stored in the data bank.

2. The process in accordance with claim 1, wherein small stacks of two or more compressed bales are grabbed and handled together with said stacking device.

3. The process in accordance with claim 1, wherein small stacks are formed in one or more intermediate storage areas, said one or more intermediate storage areas being disposed before said bale storage facility.

4. The process in accordance with claim 1, wherein the stacks of bales arranged in said plurality of rows are arranged on a side of an aisle and extend at right angles to said aisle.

5. The process in accordance with claim 1, wherein said step of managing includes managing and controlling said bale storage facility automatically.

6. The process in accordance with claim 1, wherein said compressed bales are arranged in said bale storage facility according to product-related distinguishing criteria.

7. The process in accordance with claim 1, further comprising forming bales at a compressed bale formation location wherein said compressed bales are sorted and arranged in one or more of said intermediate storage areas at the time of the formation of the small stacks, said intermediate storage areas being provided adjacent to said bale formation location.

8. The process in accordance with claim 1, wherein said compressed bales are first loaded into the bale storage facility without arrangement and are then automatically re-sorted and arranged in the said bale storage facility at a location adjacent to said stacking device.

9. A process for handling and stacking pressed bales in a bale storage facility, comprising:
   providing highly compressed bales of fibers as the pressed bales;
   loading and removing the pressed bales from the bale storage facility with a stacking device with a traveling crane bridge, with a bogie truck, with a hanging-down guide beam and with a grabbing device for grabbing one or more said pressed bales from the side, said bogie truck being provided with rotating means for rotating said guide beam, said stacking device being provided with means for remotely controlling one or more of said traveling crane bridge, said bogie truck, said hanging-down guide beam and said grabbing device;
   grabbing a pressed bale with the grabbing device from the side and holding the pressed bale with a lateral clamping movement;
   guiding said pressed bales on said guide beam vertically movably and rotatably around a vertical axis; and
   stacking the pressed bales up in stacks one on top of another with each bale in a stack in direct contact with an adjacent pressed bale in the stack, each stack consisting of a plurality of layers and said stacks being arranged in rows.

10. The process in accordance with claim 9, further comprising providing cooperation between said stacking device and an intermediate storage area, said intermediate storage area having a stack former.

11. The process in accordance with claim 10, wherein said intermediate storage area is provided with a plurality of separated storage places for pressed bale stacks.

12. The process in accordance with claim 11, wherein said storage places include a conveyor, said conveyor maintaining said bale stacks ready in a pick-up position.

13. The process in accordance with claim 10, wherein said stack former is provided with a displaceable and vertically movable bale grab.

14. The process in accordance with claim 10, further comprising connecting said intermediate storage area with one or more baling presses.

15. The process in accordance with claim 9, further comprising providing a delivery station for delivering pressed bales, wherein said stacking device cooperates with said delivery station.

16. The process in accordance with claim 9, further comprising controlling an entire facility including said stacking device and stacks and rows formed by said stacking device with a control means.

17. The process in accordance with claim 16, wherein said control means includes a computer with a storage facility management program and with a data bank, and a sorting program.

18. A process for handling and stacking pressed bales in a bale storage facility, comprising:

providing highly compressed bales of fibers as the pressed bales;

loading and removing the pressed bales from the bale storage facility with a stacking device with a traveling crane bridge, with a bogie truck, with a hanging-down guide beam and with a grabbing device for grabbing one or more said pressed bales from the side;

grabbing a pressed bale with the grabbing device from the side and holding the pressed bale with a lateral clamping movement;

guiding said pressed bales on said guide beam vertically movably and rotatably around a vertical axis;

stacking the pressed bales up in stacks one on top of another with each bale in a stack in direct contact with an adjacent pressed bale in the stack, each stack consisting of a plurality of layers and said stacks being arranged in rows; and providing said grabbing device with a plurality of transversely movable forks, arranging the forks at spaced locations one on top of another and grabbing and clamping a small stack consisting of a plurality of said pressed bales on the sides of said pressed bales.

* * * * *